US012611974B2

(12) United States Patent
Dotzler

(10) Patent No.: US 12,611,974 B2
(45) Date of Patent: Apr. 28, 2026

(54) VEHICLE SEAT WITH AIR SPRING AND DAMPER ELEMENT

(71) Applicant: GRAMMER Aktiengesellschaft, Ursensollen (DE)

(72) Inventor: Florian Dotzler, Hirschau (DE)

(73) Assignee: GRAMMER AKTIENGESELLSCHAFT, Ursensollen (DE)

( * ) Notice: Subject to any disclaimer, the term of this patent is extended or adjusted under 35 U.S.C. 154(b) by 162 days.

(21) Appl. No.: 18/651,796

(22) Filed: May 1, 2024

(65) Prior Publication Data

US 2024/0383383 A1  Nov. 21, 2024

(30) Foreign Application Priority Data

May 15, 2023  (DE) .................... 10 2023 112 706.3

(51) Int. Cl.
*B60N 2/52*  (2006.01)
*B60N 2/50*  (2006.01)

(52) U.S. Cl.
CPC ............. *B60N 2/522* (2013.01); *B60N 2/505* (2013.01); *B60N 2/525* (2013.01)

(58) Field of Classification Search
CPC ............................... B60N 2/162; B60N 2/1665
See application file for complete search history.

(56) References Cited

U.S. PATENT DOCUMENTS

| 5,388,801 | A | * | 2/1995 | Edrich | ................... | B60N 2/525 |
| | | | | | | 248/564 |
| 10,025,324 | B2 | * | 7/2018 | Lorey | .................... | B60N 2/525 |

FOREIGN PATENT DOCUMENTS

| DE | 4228061 | 2/1992 | |
| DE | 4316968 | 11/1994 | |
| DE | 10328841 | 1/2004 | |
| DE | 102008016685 | B3 * | 6/2009 | ............. B60N 2/501 |
| DE | 102016000113 | A1 * | 7/2017 | ........... B60N 2/1665 |
| DE | 102016209826 | 12/2017 | |
| DE | 102017221700 | 6/2019 | |
| EP | 0716944 | 6/1996 | |

(Continued)

OTHER PUBLICATIONS

Translation of DE-102016000113-A1 (Year: 2016).*

(Continued)

*Primary Examiner* — Joshua J Michener
*Assistant Examiner* — Ryan Andrew Yankey
(74) *Attorney, Agent, or Firm* — Sheridan Ross P.C.

(57) ABSTRACT

The invention relates to a vehicle seat, in particular for commercial vehicles, with an upper part and a lower part and with at least one air spring which exerts a resilient effect on a height-distance-movement which changes between the upper and lower parts, and with at least one damper element which damps the changing height-distance movement, wherein the air spring is connected at an air spring outlet to an adjustment device which adjusts a degree of damper hardness, which damps the changing height-distance-movement, wherein the air spring is connected at an air spring outlet to an adjustment device for adjusting a degree of damper hardness of the damper element, wherein the degree of damper hardness can be adjusted and changed by means of an air pressure of the air spring.

8 Claims, 3 Drawing Sheets

(56)  References Cited

FOREIGN PATENT DOCUMENTS

| EP | 3252338 | 12/2017 | | |
|----|---------|---------|---|---|
| FR | 3058951 | 5/2018 | | |
| GB | 2618572 A * | 11/2023 | ............ | F16F 9/0263 |
| KR | 200229015 Y1 * | 9/2001 | ........... | B60N 2/1665 |

OTHER PUBLICATIONS

Translation of KR-200229015-Y1 (Year: 2002).*
Official Action for Germany Patent Application No. 102023112706.
3, dated Nov. 30, 2023, 6 pages.
Extended European Search Report for Europe Patent Application
No. 24174749.2, dated Sep. 30, 2024, 9 pages.

\* cited by examiner

VEHICLE SEAT WITH AIR SPRING AND DAMPER ELEMENT

CROSS REFERENCE TO RELATED APPLICATION

This application claims the benefit of German Patent Application No. 10 2023 112 706.3, filed May 15, 2023, the entire disclosure of which is hereby incorporated herein by reference.

FIELD

The invention relates to a vehicle seat, in particular for commercial vehicles, with an upper part and a lower part and with at least one air spring and a damper element.

BACKGROUND

Vehicle seats with air springs and damper elements are well known from the state of the art. As is known, the air spring is used to create a spring effect in a vehicle seat when the vehicle seat moves up and down. The damper element serves to dampen this spring movement.

Until now, such damper elements, which are often installed as vertical dampers, have been installed with a fixed degree of damper hardness, which either cannot be changed at all or only allows a choice between two degrees of damper hardness by means of a manual actuation directly on the damper element. In this way, a heavy driver occupying such a vehicle seat could previously set a harder degree of damper hardness in order to avoid hitting the end stop of the air spring and the damper element when a large vibration is introduced into the vehicle seat system from the outside, for example when driving through a pothole.

Disadvantageously, a damper hardness set in advance in this way or a degree of damper hardness set in this way is always fixed during the subsequent journey in all the various operating states in question. As a result, although it is possible to pre-set the degree of damper hardness before the start of a journey, this degree of damper hardness does not change during the journey and it is therefore not possible to take into account which damping effect is considered necessary depending on the various surfaces on which the vehicle is travelling in order to achieve an optimum sprung oscillation movement and damping effect within the vehicle seat.

SUMMARY

Accordingly, it is the task of the invention to provide a vehicle seat with an air spring and a damper element which makes it possible to continuously adapt a degree of damper hardness to the respective conditions even during the operating state of a vehicle and the associated vehicle seat.

An essential point of the invention is that in a vehicle seat, in particular for commercial vehicle seats, with an upper part and a lower part and with at least one air spring which exerts a resilient effect on a height-distance-movement which changes between the upper and lower parts, and with at least one damper element which dampens the changing height-distance-movement, the air spring is connected at an air spring outlet to an adjustment device for adjusting a degree of damper hardness of the damper element. The degree of damper hardness can be adjusted and changed by means of the air spring's air pressure.

This type of coupling between the air spring and the damper element is not yet known. There is therefore a direct connection between the air spring and the damper element. As a result, the air pressure within the air spring can be advantageously used to make an initial suitable adjustment of the damper hardness level depending on the weight of a driver who is currently occupying this vehicle seat. This is because the air pressure within the air spring is known to be an indicator of the respective load on the seat or the weight of a driver. This indicator is therefore used as a control variable for the damper setting and thus the degree of damper firmness.

The connection between the air spring and the adjustment device of a vertical damper adjustment mechanism is preferably realised or implemented by means of a pneumatic hose connection and, if necessary, an additional valve device. Thus, between the air spring outlet and the adjustment device, an air pressure hose, which can have a specific diameter or different diameters in its course for air pressure regulation and can also have a different hose length depending on its use, is arranged with a first end at the air spring outlet and with a second end at an inlet of a valve device.

This valve device with an extendable and retractable piston is used to interact with the adjustment device. Conventional damper elements have a swivelling lever arm attached to the outside, the current swivel position of which is assigned to a degree of damper element hardness. Such damper elements are available as standard.

By using a valve device with a piston and coupling it to the air spring by means of the air pressure hose, it is now possible to change the swivelling lever arm in its swivelling position by extending and retracting the piston of the valve device, thus allowing different degrees of damper hardness to be set within the damper element, depending on the swivelling position in which the lever arm is currently located.

For this purpose, the valve device has the aforementioned at least one piston, which can change the swivelling lever arm in its swivel position by extending and retracting. The valve device also has a return spring for automatic retraction of the piston when the air pressure inside the air pressure hose and the air spring falls below a presettable lower limit. The use of a return spring enables the piston to be moved within the valve device only when the air pressure falls below a certain lower limit. This makes it possible, for example, for the degree of damper hardness not to change when the vehicle seat is occupied by a light driver weighing, for example, 40-50 kilograms, so that the damper element remains in its basic "soft damping" setting. As such a light driver results in a lower air pressure build-up within the air spring and thus within the air pressure hose, the piston will not move due to the return spring force and there will be no change in the degree of damper hardness.

However, if a heavy driver weighing 90-100 kilograms, for example, sits on the vehicle seat, the air pressure spring will feel a greater build-up of pressure, resulting in greater air pressure within the air pressure hose. As a result, the aforementioned presettable lower limit of an air pressure within the air pressure hose for the deflection of the return spring and thus the deflection of the piston within the valve device is exceeded and thus a change in the damper hardness of the damper element takes place due to the moving piston, which is pressed against the lever arm or an adjusting pin of the damper element. This changes the damper setting from "soft damping" to "medium damping" or "hard damping". All intermediate states are conceivable and can be assumed depending on the current swivelling position of the lever arm due to the different extension and retraction of the piston.

Preferably, the diameter of the air pressure hose and its length are selected in such a way that an optimum balance is achieved between the changing air pressure in the air spring and the changing degree of damper hardness within the damper element as a function of the various states of the vehicle seat. Of course, using an air pressure hose with a larger diameter can result in a different air pressure and a different effect on the piston of the valve device than if an air pressure hose with a smaller diameter is used. The same also applies to a piston crown surface of the piston of the valve device, which can also be of different sizes. The valve device with the piston interior can also be of different sizes in order to achieve an optimum force and pressure match between the change in air pressure of the air spring and the change in damper hardness of the damper element.

According to a preferred embodiment, the piston has at least one through-hole as an air flow connection between a first and a second internal piston chamber, the first and second internal piston chambers being separated from each other by a piston crown surface. The internal piston chambers naturally change their size depending on which retracted or extended position the piston is currently in.

By using such a through hole, it is possible for a user or driver of the vehicle seat to bring the piston into a user position in order to set a certain basic hardness or basic damper hardness of the damper element in advance. According to a preferred embodiment, a Bowden cable is attached to the swivelling lever for this purpose, which allows the lever to be swivelled into a desired swivel position by manual actuation. This allows the piston to be retracted or extended to different extents, also depending on the return spring.

Such a presetting of a desired higher degree of hardness of the damper element may be desired, for example, if the vehicle is to be driven with high accelerations and there is a risk of large pressure surges or large vibrations being introduced into the vehicle, the cabin and thus the vehicle seat. Due to the targeted adjustment of the piston by means of the through bore, only a differential pressure is required at the time of the initiated pressure surge or vibration to adjust or change the piston movement and thus the lever during the journey.

Advantageously, in the object of the present invention, the degree of damper hardness is increased in proportion to the displacement of the piston of the valve device at the same time as the air pressure within the air spring and thus within the air pressure line/air pressure hose is increased. There are essentially two possible conditions for such an increase in air pressure:

1. A driver change takes place. A heavier driver, i.e. a driver with a higher weight, sits on the vehicle seat, which creates a higher air pressure in the compressed air spring. As a result, this higher air pressure leads to an increase in pressure within the air pressure line. This in turn results in an extension of the piston in the valve device, which leads to a swivelling or a new swivelling position of the swivelling lever arm, which represents the adjustment device of the damper element. As a result, the degree of damper firmness increases and automatically adapts to the weight of the new rider.

2. An introduction from below into the system of the commercial vehicle and thus the vehicle seat takes place, for example, because a pothole or a bump is currently being driven through or over. As a result, a brief pressure shock vibration is introduced into the vehicle seat from the outside. This causes the lower part to move in height-distance relative to the upper part, resulting in a seat suspension movement. In this case, the air pressure within the air spring, which is pressurised by the lower part moving towards the upper part, is also increased. This in turn means that the degree of damper hardness also increases due to the piston movement and the adjustment of the swivelling position of the swivelling lever. As a result, the damping element reacts relatively quickly to the change in height-distance-movement from the upper part to the lower part. This rapid reaction or rapid change in the degree of damper hardness means that even when driving through a deep pothole, the end stops of the air spring and damper/damper element are not reached, as the degree of damper hardness has been increased accordingly in the short term. This prevents the driver from reaching the lower end stop of the entire system or bottoming out.

According to a preferred embodiment, at least one throttle check valve device is arranged between the air spring outlet and the adjustment device in order to obtain a delayed reduction in the damper hardness level when the air pressure is reduced. If the throttle check valve is switched in such a way that it causes a throttling or delay of the air flow that goes from the valve device back to the air spring and not the other way round, this can ensure that a relatively high damper hardness setting is maintained in the desired manner despite strong vibration movements of the vehicle seat. This is because when a vehicle seat is deflected into the lower position due to a pothole, the degree of damper hardness is increased, as already described. This is followed by an upward spring oscillation of the vehicle seat due to the resulting spring deflection. As a result, the air spring is relieved and, consequently, the air from the valve device wants to flow back to the air spring via the air pressure hose. This results in a significant reduction in the degree of damper firmness. However, if this air flowing back is throttled or delayed via a throttle check valve, the high degree of damper hardness is maintained for a certain period of time. This circumstance can prevent the upper end stop of both the damper element and the spring from being reached during the subsequent upward swing of the vehicle seat, as the damper counteracts this movement due to the high degree of hardness. Due to the throttling effect of the throttle check valve, the effect of the subsequent upward swing of the vehicle seat can thus be greatly reduced.

Of course, the dimensions of the air pressure hose and the valve device are selected in such a way that the interdependence of the changing air pressure in the air spring and the degree of damper hardness is optimised. Both the diameter of the air pressure hose and its length can influence the speed or deceleration of the damper element's degree of hardness adjustment. The spring hardness of the return spring of the valve device must also be selected accordingly.

According to the invention, a damper setting can thus be automatically adjusted with regard to the degree of damper hardness in the respective operating state of the vehicle and the vehicle seat according to the pressure shock vibrations introduced.

Further advantageous embodiments are shown in the subclaims and the following description in conjunction with the drawing.

DETAILED DESCRIPTION

Figure 1:
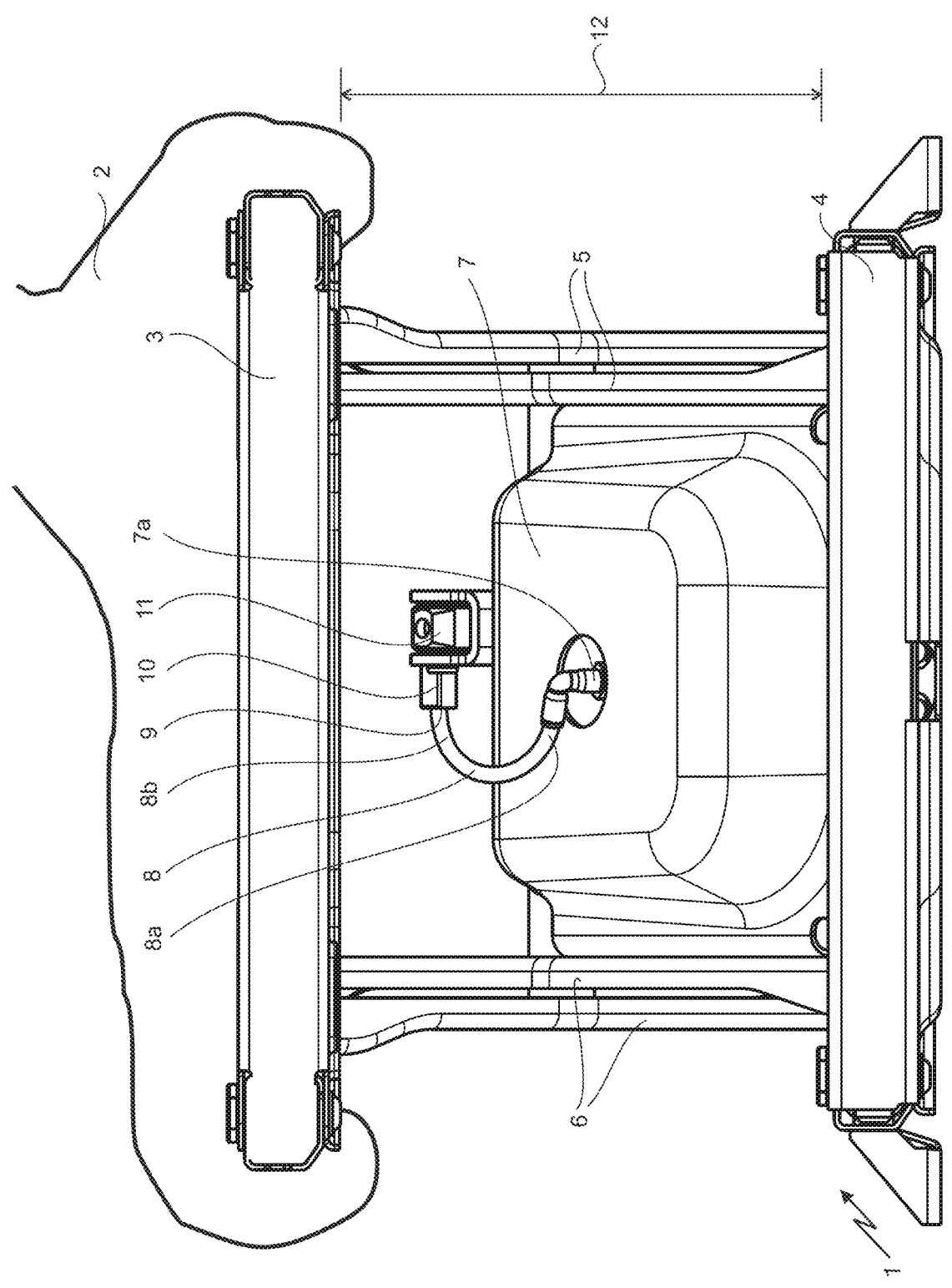
FIG. 1 a schematic side view of a vehicle seat according to one embodiment of the invention.

FIG. 1 shows a vehicle seat 1 with a cushion 2, which is only shown in part. An upper part 3 and a lower part 4 are arranged to oscillate relative to each other by means of scissor arms 5 and 6 arranged between them and can be changed in their height-distance 12 as a result of suspension and oscillation movements.

A centrally arranged air spring 7 serves to cushion the oscillating movement of the upper part relative to the lower part. The air spring 7 has an air spring outlet 7a, on which an air pressure hose 8 is arranged with a first end 8a in accordance with the invention. This air pressure hose 8 is attached by its second end 8b to a valve device 10. For this purpose, the valve device 10 has an inlet 9.

The valve device 10 is connected to a damper element 11 by means of retaining devices.

Figure 2:
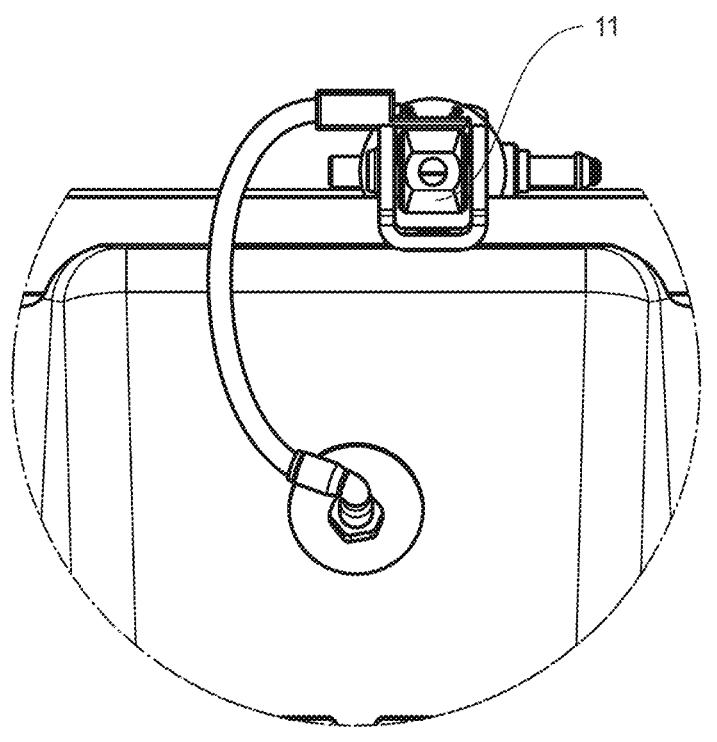
FIG. 2 a sectional view of the air spring and a damper element according to the subject of the invention.

FIG. 2 shows a sectional view of the vehicle seat according to the invention in the area of the air spring and the damper element. This representation is to be considered in more detail together with the damper element shown in FIG. 3 and the sectional representation of an installed damper element shown in FIG. 4.

As can be seen from these illustrations, the air spring has an air pressure connection with the air pressure line 8 to the damper element 11. Before the air pressure line 8 opens into the damper element 11, a valve device 10 is arranged according to the invention, which will be explained in more detail with reference to FIG. 5.

Figure 3:
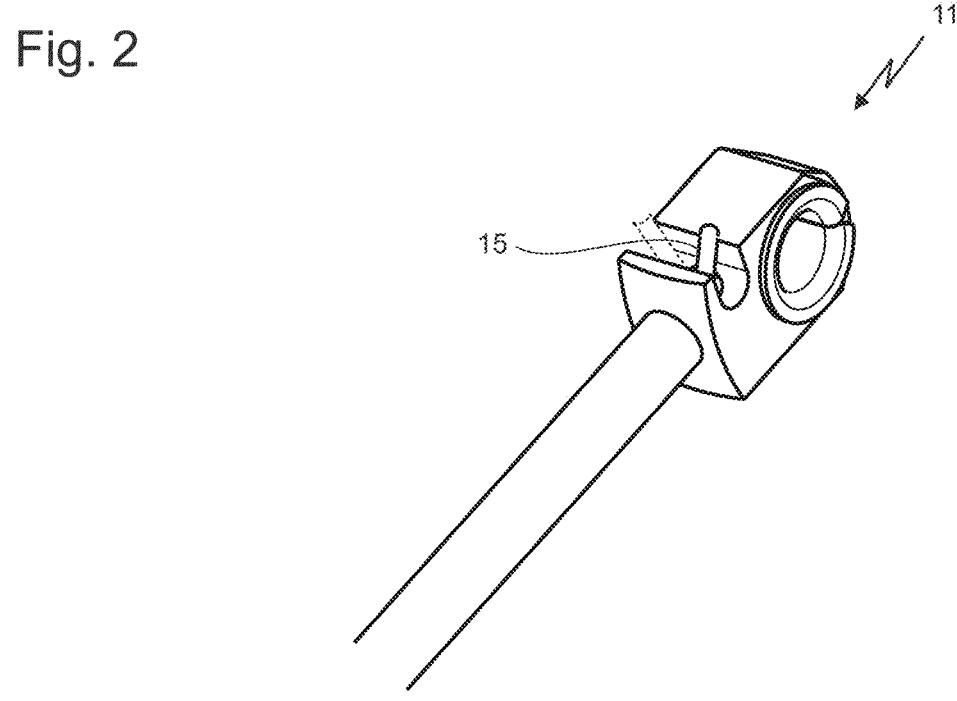
FIG. 3 a damper element for use in the subject matter of the present invention.

The damper element has a lever arm 15, as shown in more detail in FIG. 3.

The current swivelling position of the lever 15 corresponds to an associated damper hardness setting of the damper element 11.

Figure 5:
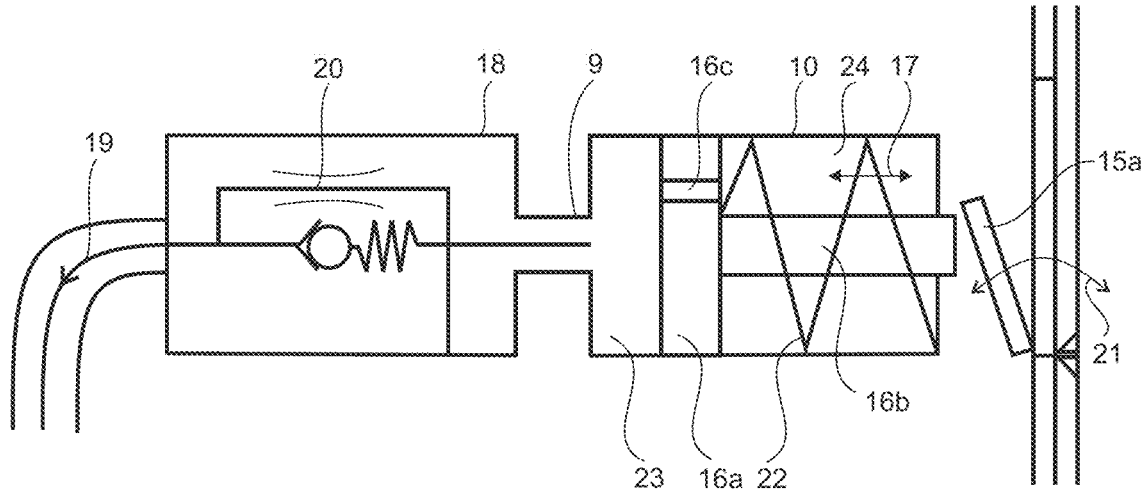

If this lever arm is deflected by means of a piston 16a, 16b—as shown in FIG. 5—by extending or retracting this piston, a change in the swivel-movement 21 takes place. As a result, the degree of damper firmness is changed.

Figure 4:
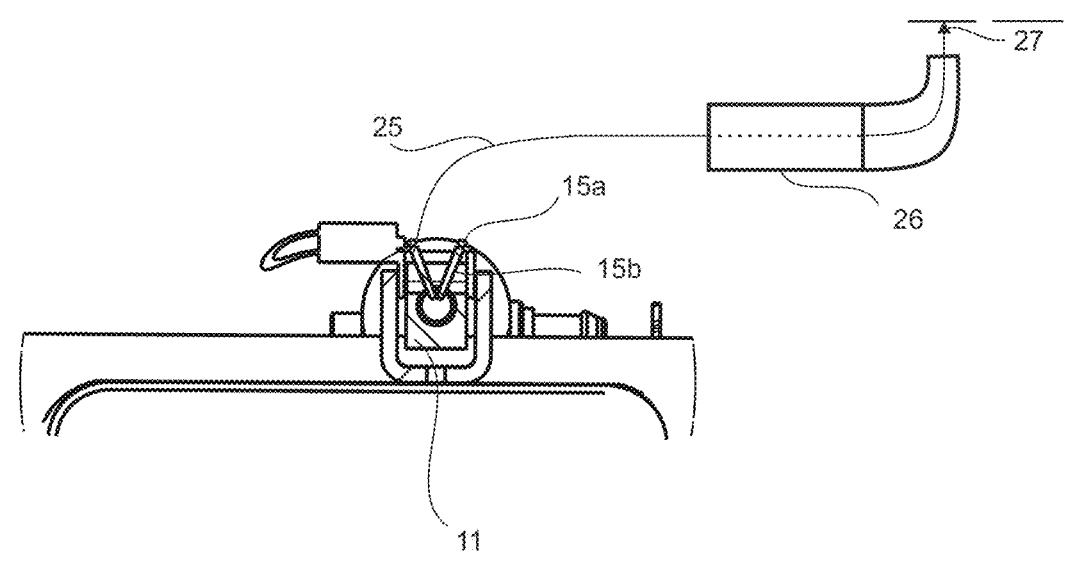
FIG. 4 a sectional view of the damper element in the installed state of the vehicle seat according to the invention and FIG. 5 a schematic representation of valve devices as may be used in the subject matter of the present invention.

Two different swivelling positions 15a and 15b of the swivelling lever 15 or lever arm 15 are shown in FIG. 4. It is also shown in this illustration that a Bowden cable 25 is connected to the swivelling lever in order to be able to bring the swivelling lever 15 into different swivelling positions by hand by means of a holding device 26, which is intended to guide the Bowden cable 25. For this purpose, for example, the Bowden cable can be pulled according to arrow 27. This results in the degree of damper firmness being preset.

FIG. 5 shows the valve device 10, at the outlet or inlet 9 of which a throttle check valve 18 is also fitted, which has a throttle section 20 and a non-return section. If the air would flow back from the valve device 10 to the air spring due to decompression of the air spring, as shown by the arrow 19, the air flow is throttled via the throttle section 20. As a result, a reduction in the degree of damper firmness is greatly delayed. This can result in the desired degree of damper firmness being maintained for a certain period of time.

The valve device 10 has a first internal piston chamber 23 and a second internal piston chamber 24, which are separated from each other by the piston crown 16a. Preferably, both chambers 23, 24 are connected to each other by means of a through-bore 16c within the piston crown in order to be able to specifically preset an arrangement of the piston within the valve device. This can be done, for example, by means of the Bowden cable 25 shown in FIG. 4.

In addition, there is a return spring 22 in the valve device 10, which has the task of automatically retracting the piston when the air pressure within the air pressure line 8 decreases and moves to the left in this illustration. A back and forth movement or retraction and extension of the piston is shown by the double arrow 17. When retracting, the damper element and thus the lever arm 15a moves to its left initial position. This is indicated by the swivelling arrow 21.

LIST OF REFERENCE SIGNS

1 Vehicle seat
2 Cushion
3 Upper part
4 Lower part
5 Scissor arm
6 Scissor arm
7 Air spring
7a Air spring outlet
8 Air pressure hose/line/air pressure line
8a First end
8b Second end
9 Inlet
10 Valve device
11 Damper element
12 Height-distance-movement/height-distance
15 Adjustment device/swivelling lever arm/lever/swivelling lever
15a Selectable swivelling position
15b Selectable swivelling position
16a Piston crown surface/piston crown
16b Piston
16c Through-hole/through-bore
17 Retraction and extension directions
18 Throttle check valve device/throttle check valve
19 Arrow
20 Throttle section
21 Swivel-movement
22 Return spring
23 First internal piston chamber
24 Second inner piston chamber
25 Bowden cable
26 Holding device
27 Arrow

What is claimed is:

1. A vehicle seat, comprising:
an upper part;
a lower part;
at least one air spring, wherein the at least one air spring exerts a resilient effect on a height-distance-movement which varies between the upper and lower parts; and
at least one damper element, wherein the at least one damper element damps the varying height-distance-movement,
wherein the air spring is connected at an air spring outlet to an adjustment device for adjusting a degree of damper hardness of the damper element, wherein the degree of damper hardness being adjustable and variable by means of an air pressure of the air spring, wherein the adjustment device is a swivelling lever arm which is attached to the damper element and whose instantaneous swivel position is assigned to a degree of damper hardness of the damper element.

2. The vehicle seat according to claim 1, wherein an air pressure hose is arranged between the air spring outlet and the adjustment device with a first end at the air spring outlet and a second end at an inlet of a valve device.

3. The vehicle seat according to claim 2, wherein the valve device has at least one piston, which changes the swivelling lever arm in its swivelling position by extending and retracting, and a return spring for automatic retraction of the piston when the air pressure in the air pressure hose falls below a presettable lower limit.

4. The vehicle seat according to claim 3, wherein the piston has at least one through-hole as an air flow connection between a first and a second internal piston chamber separated therefrom by a piston crown surface.

5. The vehicle seat according to claim 3, wherein a spring rate of the return spring can be adjusted.

6. The vehicle seat according to claim 1, wherein at least one throttle check valve device is arranged between the air spring outlet and the adjustment device in order to obtain a delayed reduction in the degree of damper hardness when the air pressure is reduced.

7. The vehicle seat according to claim 1, further comprising:

a Bowden cable for manually presetting a selectable swivelling position of the swivelling lever arm, wherein the Bowden cable is attached to said lever.

8. The vehicle seat according to claim 1, wherein the vehicle seat is for commercial vehicles.

* * * * *